Figure 1:
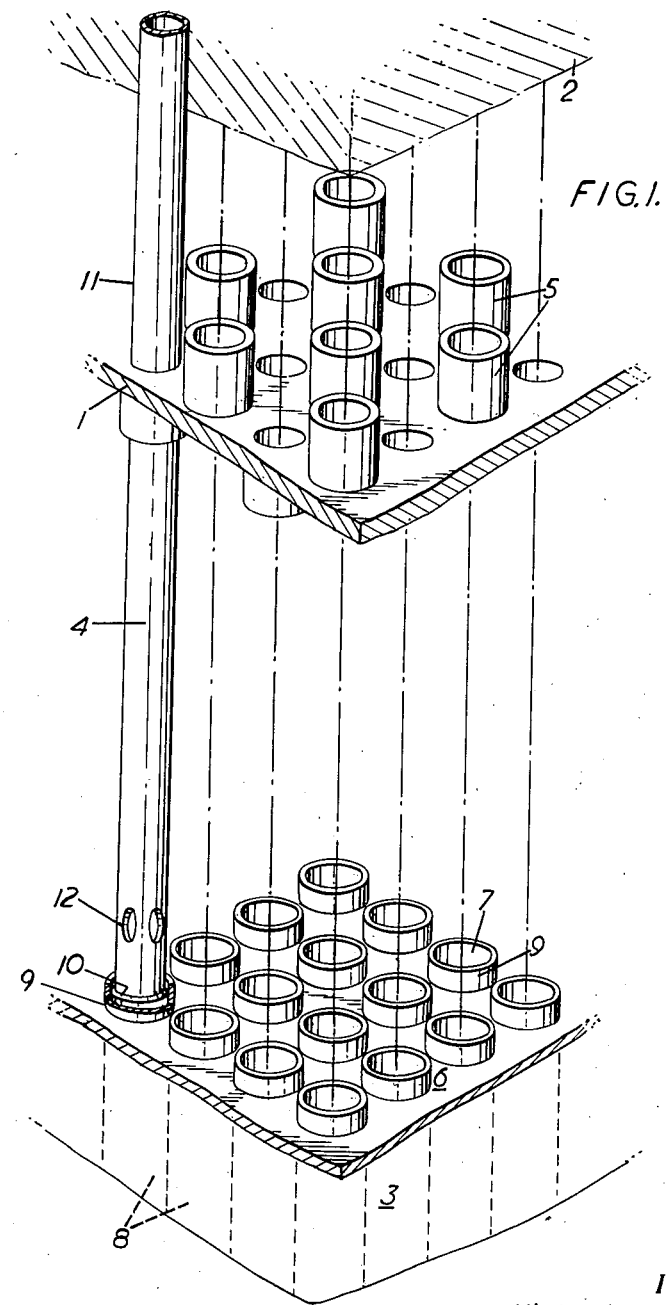

Inventor
Victor L. Summerfield
By J.P. Moran
Attorney

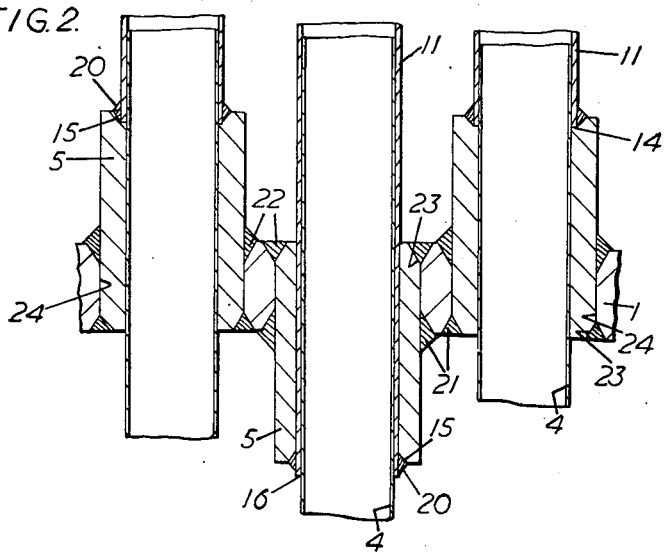
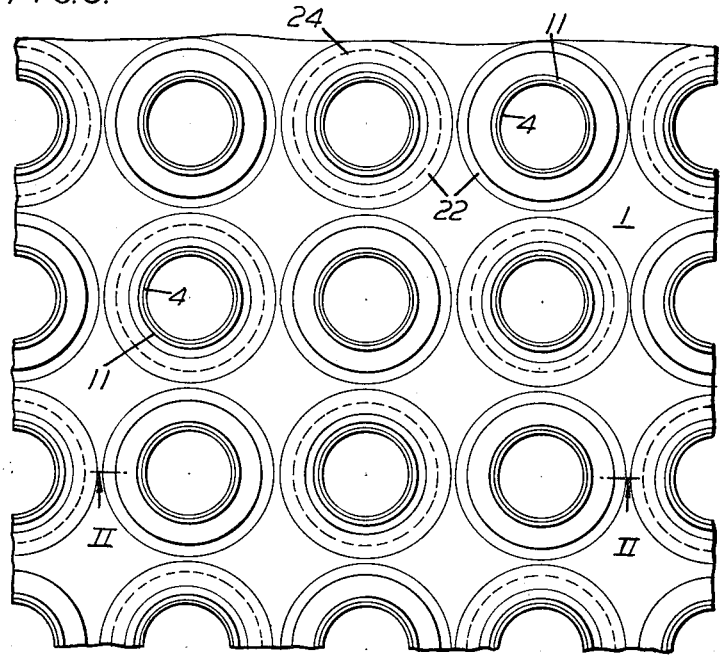
Inventor
Victor L. Summerfield

United States Patent Office 3,216,749
Patented Nov. 9, 1965

3,216,749
PRESSURE VESSEL HAVING GROUPS OF WELDING NIPPLES ALTERNATELY ARRANGED
Victor Leonard Summerfield, Montreal, Quebec, Canada, assignor to Babcock & Wilcox, Limited, London, England, a British company
Filed Apr. 19, 1960, Ser. No. 23,249
4 Claims. (Cl. 285—137)

This invention relates to pressure vessels. In a pressure vessel the outer shell, wall portion, tube sheet or the like which is adapted to contain the internal pressure of the vessel is formed with rows of apertures at which respective tubular means are welded to the shell, access to welding grooves to effect reliable welds at the side of the shell from which the tubular means extend becomes difficult or impossible when the apertures are closely spaced.

The present invention includes a pressure vessel the shell of which is formed with rows of closely spaced apertures at which respective tubular means are welded to the shell, wherein the tubular means extend from the shell at one side thereof and are united with the shell by welds at both sides thereof and alternate tubular means in rows which the tubular means form in one direction and in rows which the tubular means form in a direction transverse to the first direction include nozzles or tubular nipples which are welded to the shell and which project from the wall at the other side thereof and have united with their projecting ends respective tubes or sleeves which pass through the associated nozzles or nipples to extend at the one side of the wall. Preferably the remaining tubular means also include nozzles or tubular nipples which are welded to the shell but which project from the shell at the one side thereof and have respective tubes united with their projecting ends.

This arrangement has the advantage that the uniting welds on the one side of the shell can be made first, when the spacing between alternate nipples is sufficient to enable a welder to work satisfactorily and the remaining respective sleeves can then be inserted through their corresponding nipples and the remaining uniting welds made with ease from the other side of the shell.

The invention also includes a pressure vessel which encloses a gas-cooled heterogeneous nuclear reactor core and has its pressure shell wall formed with rows of closely spaced apertures at which respective nozzles or nipples are welded to the shell at both sides thereof and which are on the same lattice pitch as the fuel channels in the core, alternate nipples in rows which the nipples form in one direction and in rows which the nipples form in a direction transverse to the first direction projecting outwardly from the shell, whilst the remainder of the nipples project inwardly from the shell, the nipples being united at their projecting ends with respective tubular sleeves which extend outwardly away from the pressure vessel shell. This arrangement of nipples increases the access space available between nipples to make the uniting welds between each nipple and each side of the pressure vessel shell.

The invention will now be described by way of example with reference to the accompanying drawings, in which:
FIGURE 1 is a diagrammatic, fragmentary view through a biological shield, a pressure vessel shell or wall and an enclosed nuclear reactor core;

FIGURE 2 is a sectional view along the line and in direction indicated by the arrows II—II in FIGURE 3; and,
FIGURE 3 is a plan view of part of the pressure vessel shell shown in FIGURE 1.

Referring to FIGURE 1 a spherical pressure vessel, part of the shell of which is shown at 1, is surrounded by a biological shield 2 and encloses a core of a gas-cooled heterogeneous nuclear reactor, part of the core of which is shown diagrammatically at 3.

The core 3 is provided with upright fuel channels 8 through which the coolant gas passes and which at their upper ends communicate via holes 7 in an overlying charge pan 6 with respective charge tubes 4. The charge tubes 4 lead upwardly and pass individually through short tubes or nipples 5 welded to the pressure vessel shell and terminate within the upper ends of corresponding standpipes or sleeves which support the charge tubes 4 and which are set in the biological shield 2.

Charge pan 6 rests on the surface of the graphite structure of the core 3 and is a heavy metal casting having a central spigot fitting into a socket in the top of the core the weight of the casting serving to hold the top graphite bricks of the core 3 in place. There are several charge pans such as 6 associated with respective groups of 16 fuel channels 8 passing through the core 3 and placed side by side on the top of the core. The holes 7 in each charge pan are arranged to be substantially in register with the channels 8. For clarity only one complete charge pan is illustrated in FIGURE 1 and only one of the associated charge tubes 4 is shown in full, the centre lines of others being indicated by pick and dot lines. The holes 7 in the charge pan 6 have upper annular flanges 9 against the inner surfaces of which the lower ends of the charge tubes 4 are adapted to slide. The lower end of each charge tube 4 is provided externally with a peripheral lip 10 which is rounded where in contact with the inner surface of the flange 9 to permit a degree of rocking. During expansion and contraction of the pressure vessel shell 1 with respect to the core 3 a certain amount of relative movement occurs between the nipples 5 and the charge pan 6 which is accommodated both vertically and laterally by the sliding and rocking movement at the ends of the charge tubes 4. At the lower end of each charge tube 4 immediately above the annular flange 9 is formed a ring of holes 12 which allow coolant gas passing upwards through the coolant channels 8 to circulate.

Referring to FIGURE 2 the portion of each charge tube 4 external to the pressure vessel shell 1 fits loosely within a cylindrical pressure resistant sleeve 11 which constitutes the corresponding stand-pipe and which at its lower end is welded to the end of the corresponding nipple 5 that projects from the shell of the pressure vessel 1. Where the weld between the nipple 5 and sleeve 11 is external to the pressure vessel the end of the corresponding nipple 5 has an enlarged bore 14 which receives the end of the sleeve 11. Where the weld is within the pressure vessel, however, the sleeve passes through the nipple 5 which has an increased diameter to receive it, and extends slightly beyond the projecting end of the nipple 5 as at 16. An annular bevel 15 around the bore of the projecting end of each nipple 5 provides a groove between each sleeve 11 and each corresponding nipple 5 which facilitates the formation of a strong gas tight seal weld 20 between them.

The nipples 5 fit within respective holes or apertures 24 in the pressure vessel shell 1 and are welded to both the internal surface of the pressure vessel shell 1 at 21 and the external surface of the pressure vessel shell 1 to 22. Annular grooves to facilitate welding are formed in the pressure vessel shell at 21 and 22 by bevelling the edges of the holes 24 through the shell through which the nipples 5 pass. When the end of a nipple 5 is to lie flush with the surface of the pressure vessel shell 1, its outer surface is bevelled also as at 23 so that it forms in juxtaposition with the bevel at the adjacent end of the associated aperture 24 in the shell a groove of V-shaped cross section.

FIGURE 3 shows the closely spaced nipples 5 arranged in two mutually perpendicular sets of rows parallel and perpendicular to the section line II—II. Each nipple 5 is about 10 inches long of which about 5 inches projects, and the spacing between the adjacent nipples in a row is about 1½ inches. Thus it will be appreciated that it would be exceedingly difficult to make sound welds at 21 or 22 if all the nipples were to extend from the pressure vessel shell the same amount and on the same side. However, as shown in FIGURES 2 and 3 alternate nipples in each row are arranged to project from one side of the pressure vessel shell only, the remaining nipples projecting from the other side. Thus the spacing between adjacent nipples 5 projecting from the same side of the pressure vessel shell is increased to nearly 10 inches so allowing a welder to have reasonable access to carry out his welding.

The nipples 5 which project outwardly from the pressure vessel shell 1 are co-axial with and have the same internal diameter as the sleeves 11. The nipples 5 which extend inwardly from the wall of the pressure vessel 1 have an internal diameter slightly larger than the external diameter of the sleeves 11 to allow the respective sleeves to pass throughout and be welded at 20 to the projecting inner ends of the nipple 5. In order that the apertures made in the pressure vessel shell 1 may be of the same size the wall thickness of alternate nipples 5 is varied, those which project inwardly having a lesser wall thickness than those which project outwardly in order to accommodate the wall thickness of the sleeves 11.

In constructing the charge tube assembly the nipples 5 are first welded to both the inner and outer surfaces of the pressure vessel shell 1 at 21 and 22. The pressure resistant sleeves 11 are then welded to the outwardly projecting ends of the nipples 5, there being ample space for welding between these sleeves due to there being a gap of about 10 inches between alternate nipples. The sleeves which pass through the nipples are then placed in position and welded to the inwardly projecting ends of the nipples which are also completely accessible. When the sleeves 11 are welded in place the charge tubes 4 are passed through the sleeves and associated nipples 5 and located at their lower ends within the annular flanges 9 on the charge pan 6 as shown in FIGURE 1.

Although in the embodiment described the invention is applied to nipples receiving charge tubes only it will be appreciated that some of the nipples could be used instead for receiving other devices such as control rods.

I claim:

1. A pressure vessel comprising a wall means adapted to sustain a pressure differential thereacross, a plurality of closely spaced openings formed through said wall, a plurality of tubular nipples arranged in alignment one with each opening, said openings being so closely spaced that the length of the nipples projecting from the surface of said wall would substantially preclude welding the joint between said wall surface and said nipple if adjacent nipples were substantially co-extensive from the same surface of said wall, said nipples comprising a first group of alternate nipples associated with alternate openings and projecting from one surface of said wall and terminating substantially flush with the opposite surface of said wall, and a second group of intermediate nipples disposed between said alternate nipples and projecting from said opposite surface of said wall and terminating substantially flush with said first surface of said wall, and welds connecting the projecting portions of said nipples to the adjacent wall surface.

2. A pressure vessel comprising a wall means adapted to sustain a pressure differential thereacross, a plurality of closely spaced openings formed through said wall, a plurality of tubular nipples arranged in alignment one with each opening, said openings being so closely spaced that the length of the nipples projecting from the surface of said wall would substantially preclude welding the joint between said wall surface and said nipple if adjacent nipples were substantially co-extensive from the same surface of said wall, said nipples comprising a first group of alternate nipples associated with alternate openings and projecting from one surface of said wall and terminating substantially flush with the opposite surface of said wall, a second group of intermediate nipples disposed between said alternate nipples and projecting from said opposite surface of said wall and terminating substantially flush with said first surface of said wall, welds connecting the projecting portions of said nipples to the adjacent wall surface, and a plurality of tubular sleeves extending from one side of said wall connected to both groups of said nipples.

3. A pressure vessel comprising a wall means adapted to sustain a pressure differential thereacross, a plurality of closely spaced openings formed through said wall, a plurality of tubular nipples arranged in alignment one with each opening, said openings being so closely spaced that the length of the nipples projecting from the surface of said wall would substantially preclude welding the joint between said wall surface and said nipple if adjacent nipples were substantially co-extensive from the same surface of said wall, said nipples comprising a first group of alternate nipples associated with alternate openings and projecting from one surface of said wall and terminating substantially flush with the opposite surface of said wall, a second group of intermediate nipples disposed between said alternate nipples and projecting from said opposite surface of said wall and terminating substantially flush with said first surface of said wall, welds connecting the projecting portions of said nipples to the adjacent wall surface, and a plurality of tubular sleeves extending from said first surface of said wall and connected to both groups of said nipples, said tubular sleeves associated with said second group of nipples extending therethrough and being connected to the ends thereof remote from said wall.

4. A pressure vessel comprising a wall means adapted to sustain a pressure differential thereacross, a plurality of closely spaced openings formed through said wall, a plurality of tubular nipples arranged in alignment one with each opening, said openings being so closely spaced that the length of the nipples projecting from the surface of said wall would substantially preclude welding the joint between said wall surface and said nipple if adjacent nipples were substantially co-extensive from the same surface of said wall, said nipples comprising a first group of alternate nipples associated with alternate openings and projecting from one surface of said wall and terminating substantially flush with the opposite surface of said wall, a second group of intermediate nipples disposed between said alternate nipples and projecting from said opposite surface of said wall and terminating substantially flush with said first surface of said wall, welds connecting said nipples to both wall surfaces, and a plurality of tubular sleeves extending from said wall and connected to both groups of said nipples, said tubular sleeves associated with said second group of nipples extending therethrough and being connected to the ends thereof remote from said wall.

References Cited by the Examiner
UNITED STATES PATENTS

| | | | |
|---|---|---|---|
| 1,280,091 | 9/18 | Sheer | 285—189 X |
| 2,166,890 | 7/39 | Desmond | 285—158 |
| 2,183,043 | 12/39 | Kerr | 285—189 |
| 2,298,996 | 10/42 | Woods | 257—236 X |
| 2,306,612 | 12/42 | Buehner | 285—286 |
| 2,349,792 | 5/44 | Rosenblad | 285—286 |
| 2,368,391 | 1/45 | Young | 285—286 |
| 2,548,788 | 4/51 | Helme | 285—189 X |
| 2,743,089 | 4/56 | Gardner et al. | 257—236 |
| 2,763,923 | 9/56 | Webb | 285—286 |
| 2,914,346 | 11/59 | Ryder | 257—236 |
| 2,915,295 | 12/59 | Boni | 257—236 |
| 2,966,340 | 12/60 | Chapman | 285—137 |
| 3,008,735 | 11/61 | Van Wijngaarden | 285—286 |
| 3,078,551 | 2/63 | Patriarca | 285—286 |

FOREIGN PATENTS 728,656  12/42  Germany.

CARL W. TOMLIN, *Primary Examiner.*

ROGER L. CAMPBELL, THOMAS F. CALLAGHAN,
*Examiners.*